Nov. 10, 1970  HIROSHI KAWANAKA ET AL  3,538,704
BALANCE WHEEL MOTOR IN A TIMEPIECE
Filed May 15, 1968  5 Sheets-Sheet 1

INVENTORS
HIROSHI KAWANAKA
TOYOJI KANAZAWA

BY Sughrue, Rothwell, Mion,
Zinn & Macpeak
ATTORNEYS

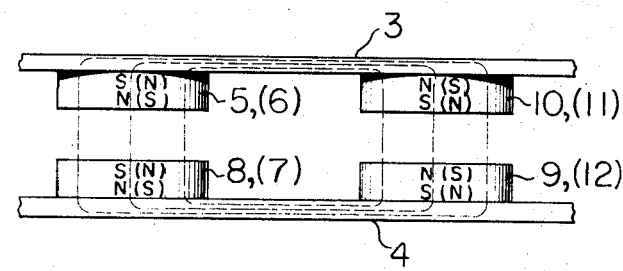
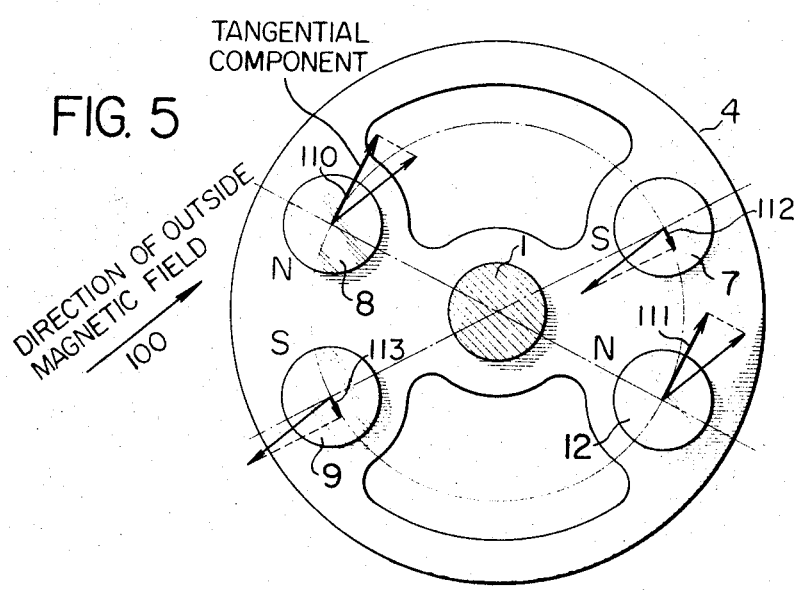
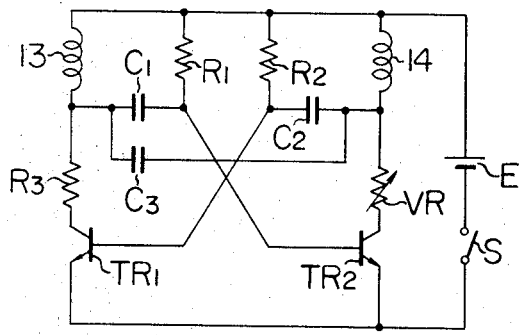
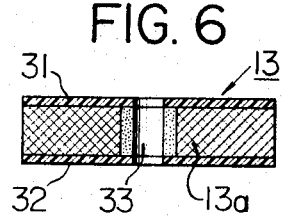

INVENTORS
HIROSHI KAWANAKA
TOYOJI KANAZAWA

BY Sughrue, Rothwell, Mion,
Zinn & Macpeak
ATTORNEYS

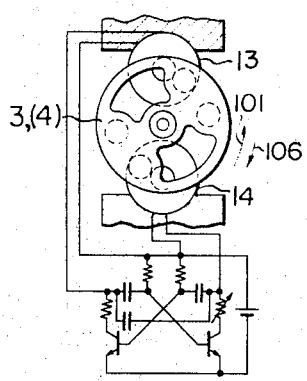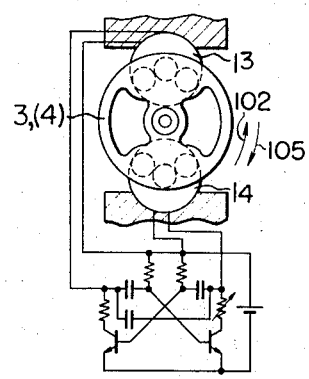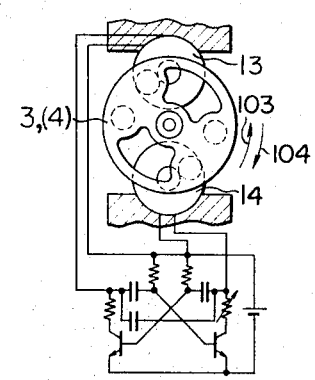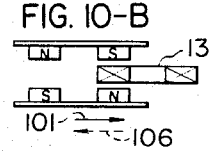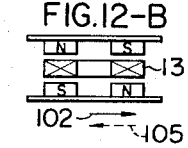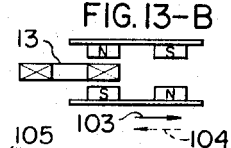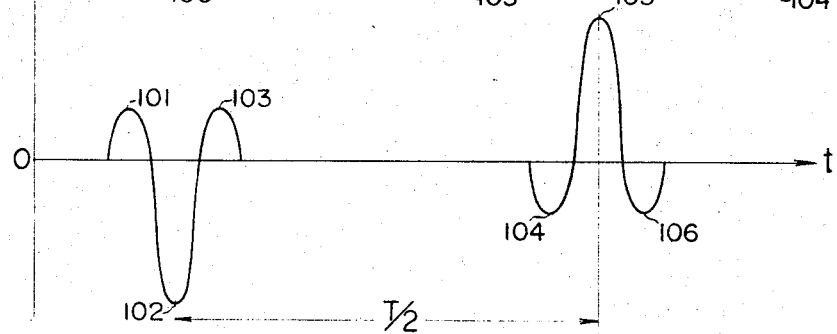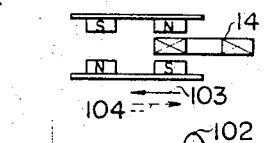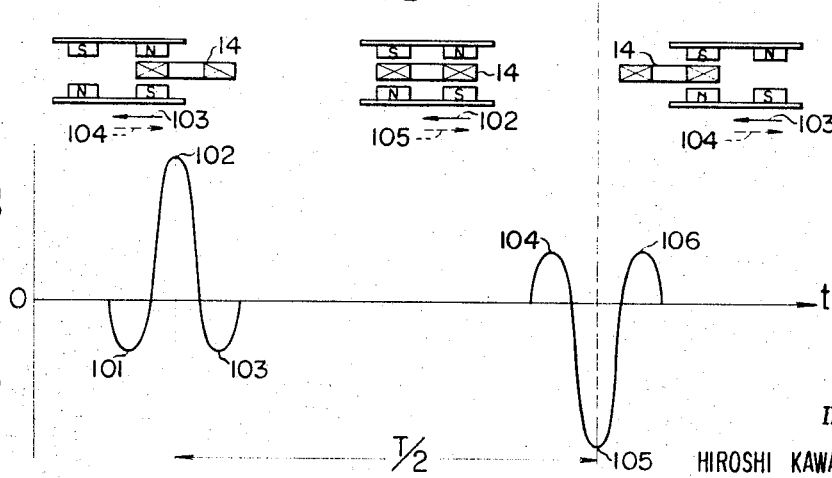

United States Patent Office 3,538,704
Patented Nov. 10, 1970

3,538,704
BALANCE WHEEL MOTOR IN A TIMEPIECE
Hiroshi Kawanaka and Toyoji Kanazawa, Tokyo, Japan, assignors to Citizen Watch Co., Ltd., Tokyo, Japan, a corporation of Japan
Filed May 15, 1968, Ser. No. 729,181
Claims priority, application Japan, May 15, 1967, 42/30,728
Int. Cl. G04c 3/04
U.S. Cl. 58—28                     4 Claims

ABSTRACT OF THE DISCLOSURE

A balance wheel assembly for a very small electronic wrist watch. A balance wheel is formed by two magnetic discs spaced axially along the rotatable shaft of the wheel. Each disc carries four permanent magnets symmetrically arranged around the shaft. A pair of fixed coils are mounted in the axial space between the two discs and are electromagnetically coupled to the magnets. The coils are connected respectively in the load circuits of two transistors which are the active elements in an astable multivibrator. The two coils are thereby alternately energized and drive the balance wheel in an oscillatory fashion.

---

This invention relates generally to small electronic timepieces, especially those for women. It concerns more specifically a balance wheel assembly adapted for fitting in a small size electronic timepiece, especially for a woman, the assembly comprising a plurality of permanent magnets carried by the balance wheel for electromagnetically cooperating with two stationary coil means, each of said coil means consisting of a sensing coil element and a drive coil element and being electrically connected with a transistor control and drive circuit known per se. Such a balance wheel assembly acts as a kind of a motor and thus may be referred to as a "drive balance-wheel" or a "balance-wheel motor."

Various motors of this kind are known in the art, but they are all for use with larger electronic timepieces for men. It should be noted however that this kind of motor has not yet been embodied in a woman's watch on account of the small force factor of such a motor.

It is therefore a main object of the present invention to provide a drive balance-wheel having a large force factor and working at a high operational efficiency which enables the motor to fit in smaller electronic watches such as women's wrist watches.

Another object is to provide a drive balance-wheel assuring isochronism, an improved direction error and a low power consumption.

The operation efficiency of the drive balance-wheel assembly depends substantially upon the force factor possessed by the assembly. When the balance-wheel oscillates, the induced voltage $V_s$, in a stationary coil under the influence of the cooperating movable magnet carried on the balance-wheel may be expressed by the following formula:

$$V_s = B_g \cdot N \cdot l \cdot v$$

where, $B_g$ is the magnetic flux density through the air gap between coil and magnet in gausses; N is the number of turns of the coil; $l$ is the effective length of the coil in cm.; and $v$ is the moving velocity of the magnet in cm./sec.

The force factor is expressed by the product: $B_g \cdot N \cdot l$. As is well known, a small value of this force factor leads to a high power consumption per unit time which is a fatal defects of a drive balance-wheel when it is intended to fit in an electronic wrist watch.

When the drive balance-wheel is designed for use in a woman's wrist watch, the wheel assembly must be made correspondingly small, thus all the elements constituting the force factor become smaller than in a larger size electronic watch. On the other hand, the working life of the battery fitted in the electronic watch should preferably extend for at least one year. With the limited capacity of the necessarily small battery contained in a woman's watch, the useful life of the battery will not last for such a long period because of the very small force factor of the cooperating drive balance-wheel assembly with the attendant high power consumption.

When a motor of the above kind is of smaller size, the value of $B_g$ will become correspondingly smaller, as was briefly mentioned above. The value of $B_g$ can be expressed by the following formula:

$$B_g = H_d \times L_m / L_g$$

where, $H_d$ = demagnetizing field corresponding to $BH_{max}$. of the magnet; $L_m$ = length of the magnet and $L_g$ = length of the air gap. In a small size motor, the magnet size must be correspondingly reduced, thus the value of $L_m$ is necessarily small. If it were possible to reduce the value of $L_g$, the value of $B_g$ would be correspondingly increased. In practice, however, two coils must be provided in the magnetic circuit, and each of said coils must have a certain predetermined number of turns. Therefore, the amount of reduction of $L_g$ is highly limited. Thus, the value $B_g$ must be a very small value which increases the power consumption too much to be applied to the drive balance-wheel assembly of a woman's wrist watch. As will be more fully explained below, when relying upon the novel teaching of the invention, the aforementioned conventional drawback can be substantially remedied so that a drive balance-wheel assembly can be fitted in a small watch, such as a woman's wrist watch, without an accompanying substantial increase in power consumption, thereby providing a considerable advance in the art.

On the other hand, with the use of a conventional magnetic circuit such as is frequently employed in an electronic timepiece wherein there are provided two coils in the air gap, the weight of the balance-wheel, especially the wheel rims or wheel proper, must be as light as possible (while still shielding the magnets in an effective manner) in order to reduce the power consumption as much as possible when the weight mass of the permanent magnets is increased to increase the value of $B_g$. In this case, the magnetic shielding parts or yokes provided in or on the balance-wheel must be as thin as possible relative to the mass of the permanent magnets, thereby permitting leakage fluxes to be emanated to a considerable degree and the drive balance-wheel to be subjected to the influence of the earth's magnetism to a corresponding degree. This phenomenon will invite the so-called direction error.

As will be more fully described hereinafter, in this invention the magnetic shielding yoke for the magnet can be of a substantial mass in comparison with that of the permanent magnet and therefore, the thickness of the yoke can be made substantially larger than is possible in the aforementioned conventional drive balance-wheel assembly, thereby reducing to a possible minimum the effect of the earth's magnetism.

In the conventional drive balance-wheel assembly, there must be counter weights arranged symmetrically with the magnets about the wheel shaft. According to the novel teaching of the invention, these magnetically ineffective superflous masses can be converted into effective magnetic means. By adopting this means, the force factor of the drive balance-wheel can be increased to double that available in the prior art.

These and further objects, features and advantages of the invention will become clearer from the following detailed description and accompanying drawings of a preferred embodiment of the invention.

In the drawings:

FIG. 4 is a schematic side view of one of the two magnetic circuit means.

FIG. 5 is a schematic and illustrative plan view of the balance-wheel, showing the influence of the earth's magnetism thereupon.

FIG. 6 is a schematic and simplified sectional view of one of the two coil means employed.

FIG. 7 is a wiring diagram of the transistor control and drive circuit attached to the drive balance-wheel assembly.

FIGS. 10-A, 10-B, 12-A, 12-B, 13-A, 13-B and 14 are illustrative views showing the voltage induced in the first and second coil assembly in cooperation with eight permanent magnet in several operating steps of the balance-wheel assembly.

Figure 11:
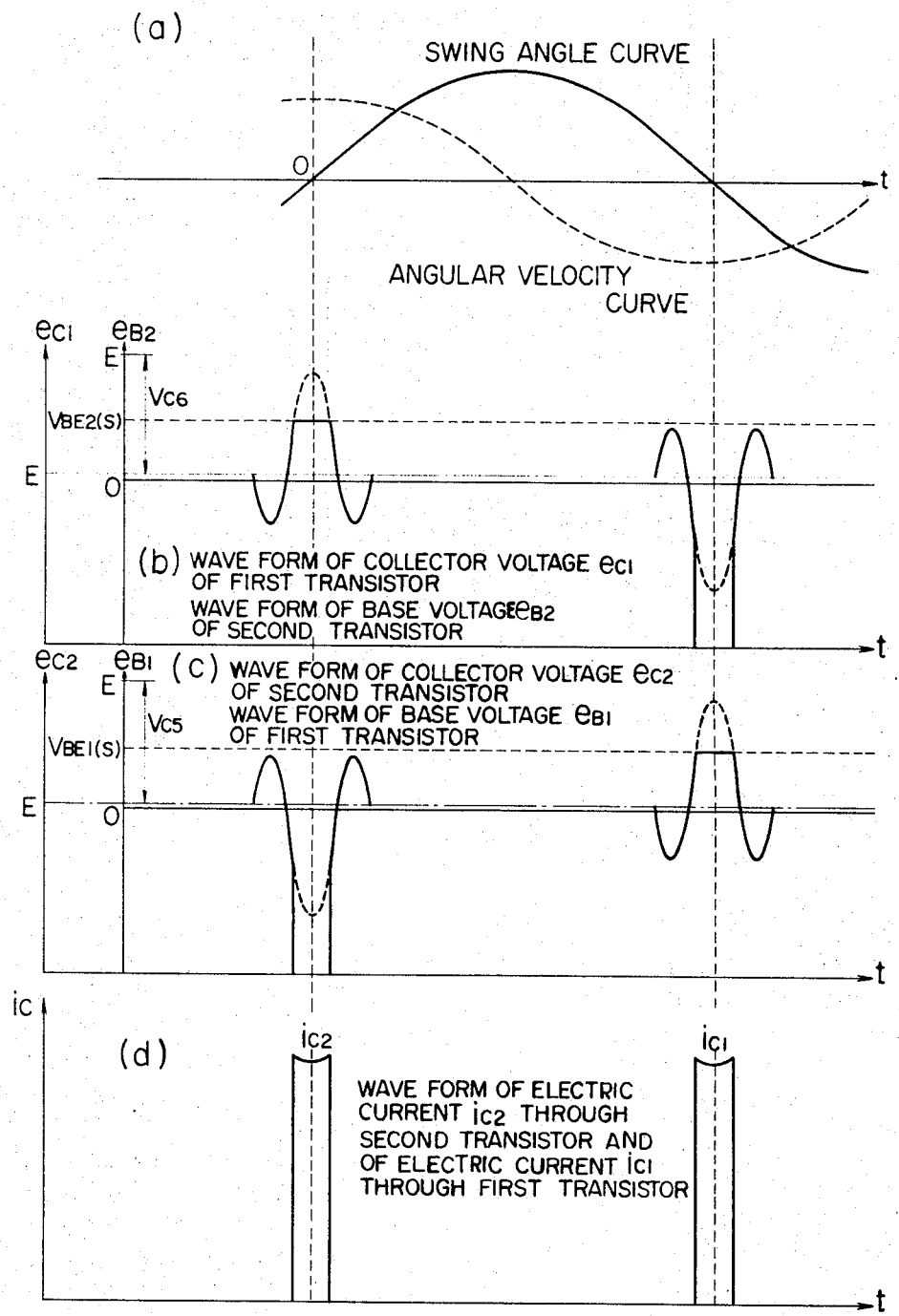

FIG. 11 shows several voltage and current waves appearing at several places of the circuit.

Figure 1:
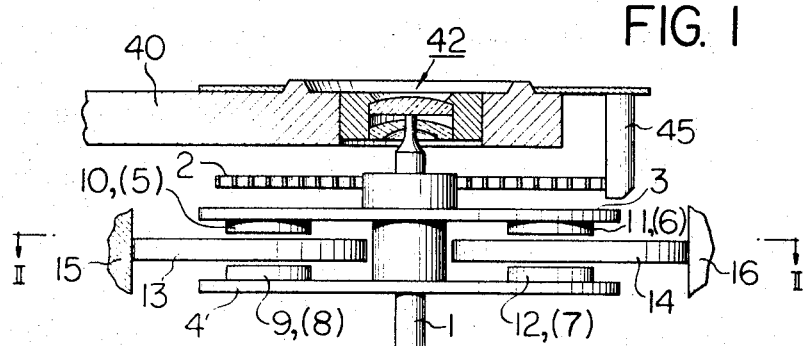
FIG. 1 is a schematic side view of a drive balance-wheel assembly of the invention in its rest position, wherein however several parts are shown in section.
Figure 2:
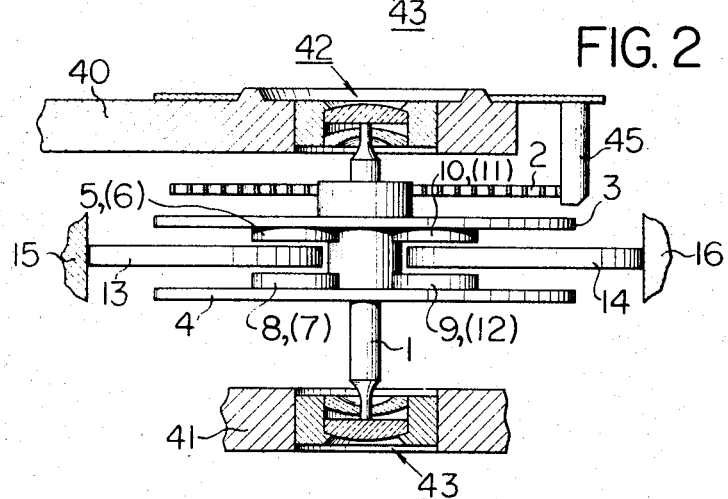
FIG. 2 is a similar view of the assembly to FIG. 1 wherein however the balance-wheel is shown in its extreme stroke position.
Figure 3:
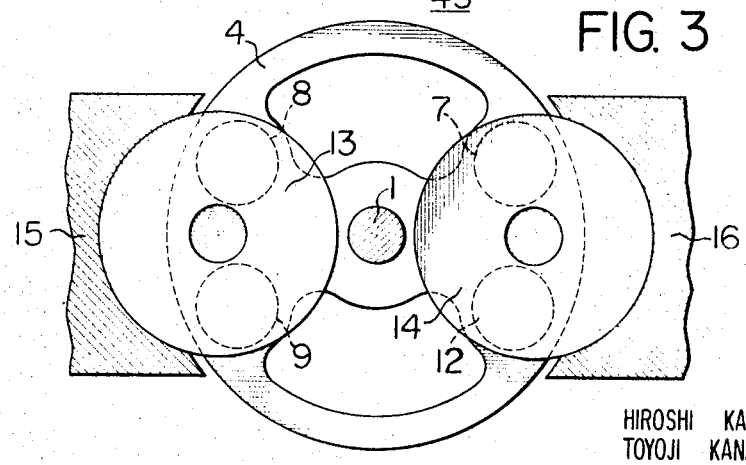
FIG. 3 is a sectional view taken along the sectional line II—II shown in FIG. 1, especially showing the relative position between the coil means and the magnet means.

Now referring to the drawings, especially FIGS. 1–3 thereof, the numeral 1 represents the shaft of a drive balance-wheel which shaft is mounted for rotary oscillation in upper and lower conventional bearing assemblies 42 and 43 which are mounted in a balance-wheel bridge 40 and a lower plate 41 of conventional design and thus are only partially shown. Two wheel rims or discs 3 and 4 are fixedly attached to the wheel shaft 1 so that they are parallel to each other and at a fixed distance apart. Four permanent magnets 5, 6, 10 and 11 are fixedly mounted on the upper wheel disc 3, and in a similar way the lower wheel disc 4 mounts four permanent magnets 7, 8, 9 and 12, as shown.

As seen from FIGS. 3 and 4, magnetic flux passes through a first path consisting of elements 5, 3, 10, 9, 4, 8 and 5 on the one hand, and a second path consisting of elements 6, 3, 11, 12, 4, 7 and 6, on the other hand. Between the two pairs of opposing magnets 5, 8 and 9, 10 there is a first coil means 13, when the balance-wheel is in its neutral position shown in FIGS. 1 and 3. In a similar way, there is a second coil means 14 between two pairs of opposing magnets 6, 7 and 11, 12. Even though the coils and magnets are quite close to each other, there is sufficient space between them to allow for play in the moving parts so that the coils and magnets do not collide. First coil means 13 is supported rigidly on a first stationary support member 15 only schematically shown. In a similar way, second coil means 14 is supported fixedly on a second support member 16. Both members 15 and 16 may be rigidly fixed to the lower plate 41, although not shown. Coil means 13 and 14 have the same number of turns and are fixed to the respective support members 15 and 16 by, for example, a suitable adhesive.

As seen from FIG. 3, the two pairs of neighboring permanent magnets 8, 9 and 7, 12 mounted on the lower wheel disc 4 are arranged in symmetrical relation with each other and relative to the wheel shaft 1. The same symmetry applies to the remaining two pairs of neighboring permanent magnets 5, 10 and 6, 11 which are fixedly mounted on the upper wheel disc 3. Therefore, the first closed magnetic circuit: 5–3–10–9–4–8–5, and the second closed magnetic circuit: 6–3–11–12–4–7–6, are symmetrical with respect to each other about the wheel shaft 1. The coil means 13 and 14 are spaced 180 degrees apart as shown in FIG. 3.

A hair spring 2 and a hair spring stud 45 are of conventional design and thus no further description thereof is necessary.

The coil means 13 and 14 are so wound and arranged that they have opposite polarities. More specifically, the rotational direction of the balance-wheel when one of the coil means is energized is in opposite to that when the other coil means is energized.

The hair spring 2 acts to position the balance-wheel in its neutral position shown in FIG. 3 and to regulate the oscillating motion of the wheel, all in a conventional manner. In addition, the coils and magnets are so arranged relative to each other that in this position the number of interlinkage between the coils and the magnetic fluxes of the magnets is at a maximum.

Figure 9:
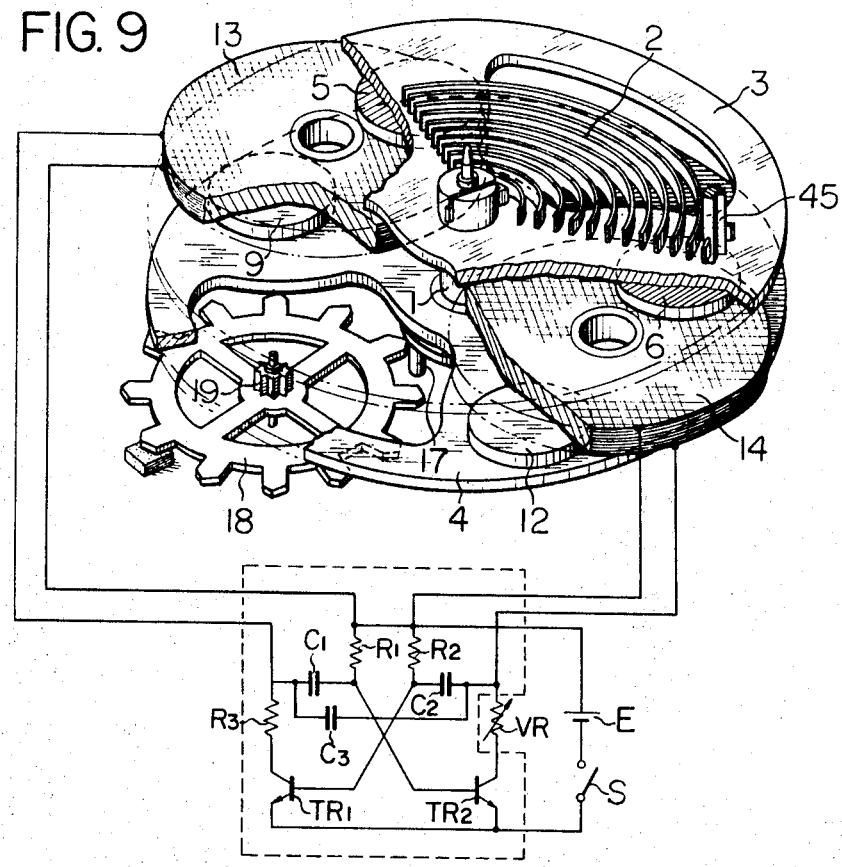
FIG. 9 is a schematic and illustrative perspective view of the drive balance-wheel assembly, together with the electronic circuit shown in FIG. 7, as well as several conventional watch components.

Now referring to FIG. 9, the drive balance-wheel is caused to oscillate in the normal manner under the influence of a control and drive circuit by closing a switch S included therein. The circuit includes the coils 13 and 14, transistors TR1 and TR2, fixed resistors R1, R2 and R3, a variable resistor VR, condensers C1, C2 and C3 and a battery E, and is connected as shown in FIG. 7. It is easily seen that the balance-wheel is brought into oscillation, and motion is transmitted therefrom through an impulse pin 17 to an escape wheel 18 which is thereby driven in a certain definite direction. This rotational movement of the wheel 18 is transmitted to a pinion 19 integral with the shaft of the wheel and then transmitted to a conventional time-indicating gear train, not shown, in a conventional manner.

In FIGS. 10-A, 10-B, 12-A, 12-B, 13-A, 13-B and 14 several relative positions between two coils and two magnetic circuits are shown, together with the induced voltages in the coils. The maximum induced voltage $V_s$ may be expressed by the following formula:

$$V_s = 2 \cdot B_g \cdot N \cdot l \cdot v$$

where
$B_g$ = flux density at the air gap;
$N$ = number of turns of coil;
$l$ = effective length of coil; and
$v$ = moving velocity of magnets.

FIGS. 10-A and 10-B show schematically the balance-wheel assembly which is positioned at the starting point of its going stroke for effecting an oscillating movement in the counter-clockwise direction. This operating stage is shown by the arrow at 101. FIGS. 12-A and 12-B show a neutral position which has been reached from the position shown in FIGS. 10-A and 10-B. This operating stage is shown by the arrow at 102. FIGS. 13-A and 13-B show the extreme position of the going stroke of the balance-wheel assembly and this operating mode is shown by the arrow at 103. In the reverse or returning stroke, the wheel occupies three successive stages shown by arrows 104, 105 and 106. The induced voltages in the first coil 13 during this complete reciprocating movement are shown in the top portions of FIG. 14.

During the same oscillating period T, voltages having reversed polarity are induced in the second coil 14, as shown in the lowest level of these figures. Correspondency of these induced voltage curves to said six operating steps during one complete oscillation can be easily identified by consulting the same identifying numbers 101, 102 ... 106.

As shown in FIGS. 7, 8, 9, 10-A, 10-B, 12-A, 12-B, 13-A, 13-B and 14, the first and second coils 13 and 14 are connected as loads to the collector electrodes of the transistors TR1 and TR2, respectively, so as to have opposite polarities of voltage, as was briefly pointed out hereinbefore.

The transistor circuit so far shown and described acts as an astable multivibrator when the coils 13 and 14 are assumed to be resistors. The oscillation period of this multivibrator depends substantially upon the circuit time constants, or more specifically the product of R1 and C1 on the one hand, and the product of R2 and C2 on the other hand.

When the switch S is closed, the multivibrator will begin self-oscillation with the aforementioned oscillation period. By the collector currents thus induced, the balance-wheel will start to oscillate and the oscillation will develop rapidly because of the inherent nature of the multivibrator to lock into synchronism. When the stabilized state of operation of the multivibrator has been once attained, the collector voltages may take the curves $e_{c1}$ and $e_{c2}$ shown at $(b)$, $(c)$ in FIG. 11, in correspondence to the swing angle curve shown at $(a)$ in the same figure. The base voltages of the both transistors may take the form of curves $e_{B2}$ and $e_{B1}$ shown again at $(b)$, $(c)$ of the same figure.

On the other hand, since the time constant of the transistor circuit has been selected to be a value which is substantially larger than the oscillating period of the balance-wheel, D.C. voltages Vc5 and Vc6 having a polarity as shown and magnitudes correspond to the induced voltages in the coils will appear across the condensers C1 and C2, respectively. These voltages serve to negatively bias the transistors, thereby preventing any collector current from flowing in various cases where the generation of unintentional drive pulses should be cut off especially during non-signal periods, half induced voltage generating periods, over-swing periods of the balance-wheel and the like. The selection of such a cut-off level so as to suppress the generation of undesired and disturbing pulses at the over-swing operation of the balance-wheel can be made because of the large value of force factor obtainable with the specifically designed magnetic circuit employed in the drive balance-wheel assembly embodying the novel teaching of the present invention. The drive current in the present balance-wheel system will appear twice during a complete oscillating period, as illustrated in FIG. 11 at $(d)$ by the current characteristic curves at $ic1$ and $ic2$. These drive currents are fed at the respective neutral positions of the balance-wheel during its oscillating movement and thus the operating efficiency can be deemed to be a possible maximum.

In the conventional comparative arrangement, however, when the balance-wheel should oscillate over 120 degrees, disadvantageous drive pulses are frequently generated which disturbs considerably the isochronic operation of the timepiece fitted with the drive balance-wheel. With the improved balance-wheel assembly of the invention, the aforementioned conventional drawback can be definitely remedied. In addition, the drive current is delivered definitely and accurately each time at the neutral position of the balance-wheel.

With the symmetrical arrangement of the permanent magnets proposed by the invention, the coils are also designed and arranged in a symmetrical order which will provide a chance for providing a highly condensed coil arrangement to provide dense and powerful coils to be fitted in a highly limited coil space.

Although the magnetic shielding members which are constituted in the present embodiment by the balance-wheel discs 3 and 4 themselves can be made thicker than in the comparative conventional cases, leakage fluxes may appear to a certain degree.

In the present embodiment, as illustrated in FIG. 5, there is provided an efficient counter measure to suppress this kind of disadvantage.

In this illustrative representation, the arrow 100 shows the general direction of an outside disturbing magnetic field. This magnetic force will act upon each of four permanent magnets arranged in a plane as shown and each of the thus developed forces can be analyzed into tangential and diametrical components. The tangential components will not disturb the oscillating period of the balance-wheel, because each pair of the thus induced turning torques, such as those denoted by arrows 110 and 111 on the one hand and by arrows 112 and 113 on the other hand, are balanced out with each other completely, whereby there is substantially no adverse effect caused by the outside magnetic field. This observation will apply equally to the case of the earth's magnetism.

In FIG. 6 there is shown an embodiment of the coil means 13 which comprises a bobbin tube 33, preferably made of ceramic upon which 3,000 turns of insulated copper wire 13a are wound. Upper and lower protective discs 31 and 32 are each 10 microns thick and made of a polyester fixed to the body of the coil by a conventional adhesive, for example. The other coil means 14 should preferably be of the same design and configuration.

Figure 8:
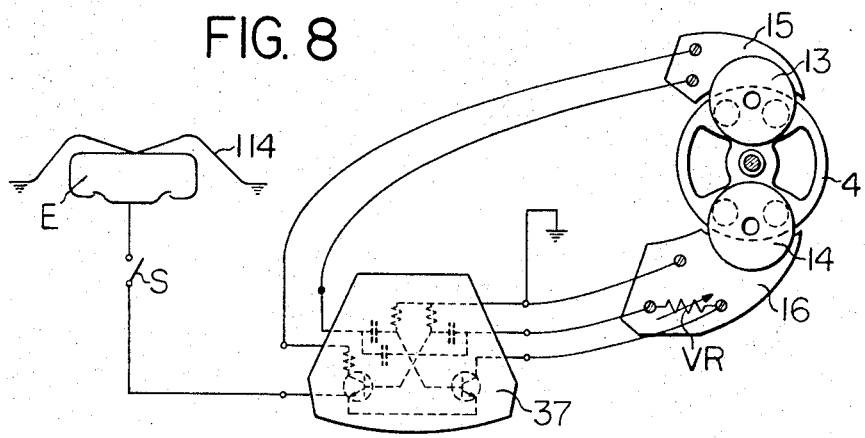
FIG. 8 is a schematic and explanatory view of the combination of the balance-wheel assembly and the transistorized circuit shown in FIG. 7.

In FIG. 8, a preferred combination mode of several constituents of the balance-wheel assembly is shown. The battery E is positioned by a spring fixture 114 on a suitable stationary member, such as the lower plate 41. The control and drive circuit is also assembled and sealed in a plastic block 37. At both sides of the balance-wheel proper, said supporting members 15 and 16 are arranged so as to cooperate therewith.

EXAMPLE

A practical embodiment of the drive balance-wheel has the following numerical data: max. O.D. of balance-wheel: 7.8 mm.; thickness of yoke: $0.13\times2=0.26$ mm.; thickness of magnetic means: $0.28\times2=0.56$ mm.; air gap: 0.51 mm.—Thus, the thickness of the balance-wheel proper (measured from the upper surface of yoke 3 to the bottom surface of yoke 4 in FIG. 1) will amount to 1.33 mm.; overall weight of balance-wheel assembly including shaft and hair spring: 126 mg.; moment of inertia of the assembly: 1021 mg.-mm.$^2$; hair spring: 14 turns; spring constant thereof: 116 mg.-mm./rad; number of oscillations: 36,000/hour; material of yoke: pure iron, heated at 900° C. for 1 hour in hydrogen atmosphere; permanent magnet: O.D. 1.5 mm. and length: 0.28 mm.; number of magnets: 8; material, Pt-Co-alloy, having magnetic characteristics: Br: 7,000 gausses; Hc: 5,500 oersteds; (BH) max: $9.6\times10^6$ [g. oe]; Bd: 3,500 gausses; Hd: 2,750 oersteds; Coil: O.D. 4.5 mm.; I.D. 1.0 mm.; copper wire proper: $10\mu$; O.D. including insulation: $13\mu$; Transistors: NPN-type, epitaxial planar silicon transistors; Condensers C1 and C2: 0.47 $\mu$f./3v.; condenser C3: 200 pf.; resistors R1 and R2: 10 Mohms; resistor R3: 5 kilohms; variable resistor RV: 10 kilohms; battery: mercury, WH–1 (made by Mallory), 1.3 volts, 30 ma. h.; dimensions of movement: 15.3 mm. x 17.8 mm. x 5.0 mm.

With a long period experiment with the aforementioned small movement fitted with the above-specified drive balance-wheel assembly, it was found that the power consumption amounted only to 3.7 $\mu$a.$\times$1.3 v. With the above battery, the useful life thereof extended for over one year. The oscillating angle of the balance-wheel could be adjusted from 220 to 140 degrees as desired by means of the variable resistor VR.

*Daily stepping error.*—from $-5$ to $+10$ seconds per day, max.
*Daily error fluctuation.*—6.0 seconds per day, max.
*Position error.*—20 seconds per day, max.

The starting period was as short as 1 second from switching in.

It will be obvious to those skilled in the art that many modifications may be made in the embodiment described above while remaining within the scope of the present invention and without departing from the spirit thereof, and the invention includes all such modifications.

What is claimed is:
1. A drive balance wheel assembly for a small timepiece comprising:
   (a) a balance wheel assembly comprising:
       (1) a shaft mounted in said timepiece for rotary oscillation
       (2) upper and lower balance wheels made of magnetic material and fixed to said shaft, said wheels being axially spaced on said shaft
   (b) a pair of stationary coils fixed to said timepiece and positioned in the axial space between said wheels
   (c) a plurality of first magnets fixed on said upperwheel and spaced radially equi-distant from the axis of said shaft
   (d) a like plurality of second magnets fixed on said lower wheel in the identical relative positions of said first magnets on said upper wheel, and cooperating with said plurality of first magnets to create two independent magnetic circuits each of which is spaced away from said shaft and extending through each of said upper and lower balance wheels
   (e) a two-stage semiconductor astable multivibrator circuit mounted in said timepiece, and
   (f) means connecting said coils to the respective stages of said multivibrator so that said coils are alternately driven when said multivibrator circuit is energized, thereby imparting oscillatory motion to said balance wheels.
2. A drive balance wheel assembly as defined in claim 1 wherein:
   (a) the opposite facing poles of corresponding pairs of said first and second magnets are of opposite polarity,
   (b) said magnets being arranged in two sets each containing an equal number of said first and second magnets, and
   (c) each set forming one of said independent magnetic circuits with said balance wheels.
3. A drive balance wheel assembly as defined in claim 3 wherein there are four first magnets and four second magnets, and each set consists of two pairs of said first and second magnets.
4. A drive balance wheel assembly for use in a small timepiece comprising:
   (a) a balance wheel mounted for oscillation in said timepiece,
   (b) eight permanent magnets fixed on said balance wheel and movable therewith,
   (c) a pair of stationary coils fixed to said timepiece for electromagnetically cooperating with said magnets,
   (d) said magnets being arranged in two independent magnetic circuits and being arranged symmetrically about the center of the balance wheel wherein each of said magnetic circuits is spaced away from said center and parallel to each other,
   (e) a transistorized astable multivibrator circuit mounted in said timepiece, and
   (f) means connecting said coils to said multivibrator circuit so that said coils are alternately energized by the operation of said circuit, whereby oscillatory motion is imparted to said balance wheel.

References Cited
UNITED STATES PATENTS 3,407,344   10/1968   Bansho _____ 58—28

FOREIGN PATENTS 1,224,670   9/1966   Germany.

RICHARD B. WILKINSON, Primary Examiner

C. SIMMONS, Assistant Examiner

U.S. Cl. X.R.

318—130